Oct. 23, 1934.  J. H. BRYANS  1,977,754
TRUING CALIPER
Filed July 15, 1932

Inventor
J. H. Bryans
By C. A. Snow & Co.
Attorneys.

Patented Oct. 23, 1934

1,977,754

UNITED STATES PATENT OFFICE 1,977,754

TRUING CALIPER

James Herbert Bryans, Hastings, Nebr.

Application July 15, 1932, Serial No. 622,771

2 Claims. (Cl. 33—203)

This invention relates to a caliper designed primarily for use in truing the balance wheels of watches. While calipers for the purpose have already been devised, it has not been possible with any of them to obtain an unobstructed view of the hairspring collet. Nor has it been possible to true the hairspring while on the balance wheel.

It is an object of the present invention to provide a very simple, compact and efficient truing and poising tool which fits comfortably in the hand and can be both adjusted and locked by the fingers of the hand holding it.

A further object of the invention is to provide a tool which allows the user to operate on the innermost coil of the hairspring with truing tweezers, this being possible because of the convenient access afforded as a result of the peculiar construction and arrangement of the bearing portions.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawing the preferred form of the invention has been shown.

Figure 1:
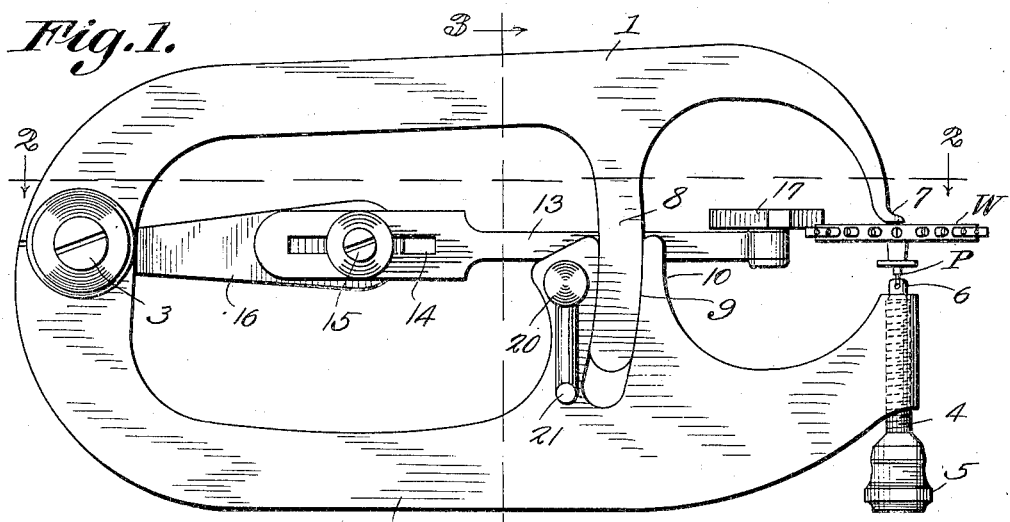
Figure 1 is an enlarged side elevation of the caliper showing a balance wheel in position thereon.

Referring to the figures by characters of reference 1 and 2 designate the top and bottom arms of the caliper, these being pivotally connected at one end, as shown at 3. The other end of the arm 2 has a screw 4 extending therethrough provided at its lower end with a head 5 by means of which it can be rotated readily. The other end 6 of the screw provides one of the bearings for the pin of the balance wheel.

Figure 2:
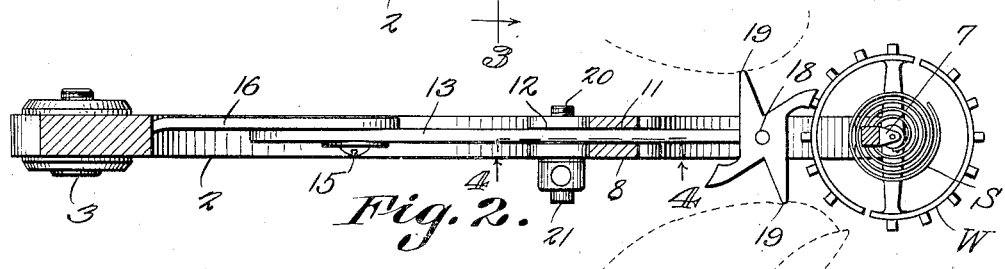
Figure 2 is a section on line 2—2, Figure 1.
Figure 3:
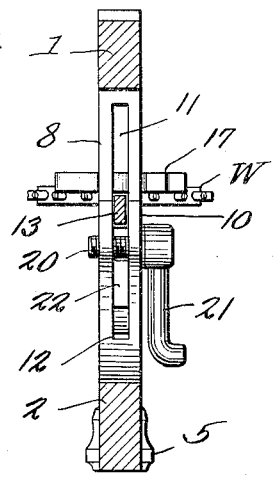
Figure 3 is a section on line 3—3, Figure 1.
Figure 4:
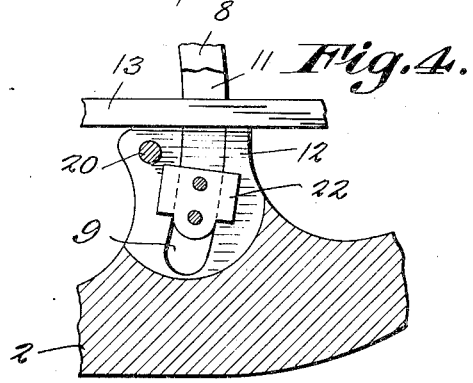
Figure 4 is a section on line 4—4, Figure 2.

Arm 1 has its free end reduced and offset to form an L-shaped bearing 7 for the other end of the pin, this bearing 7 being tapered as indicated clearly in Figure 2.

Extending from arm 1 is an arcuate guide finger 8 concentric with the pivot 3 and slidable within an arcuate slot 9 formed in an extension 10 carried by the arm 2. Both the extension and the finger 8 are slotted longitudinally of the tool, as indicated at 11 and 12 respectively, and extending through these slots is an indicator bar 13, one end of which is slotted longitudinally as at 14 and pivotally and slidably connected by a screw 15 to a supporting bar 16 mounted on the pivot 3. Bar 13 carries an angularly adjustable indicator 17 which is reversible on a pivot 18 and has oppositely extending points 19 for engagement and actuation by the thumb and forefinger holding the tool. A binding screw 20 is extended through the extension 10 and has a small lever or finger piece 21 by means of which it can be quickly rotated. A slide 22 is carried by finger 8 and projects into the slot 12. Thus when the screw 20 is tightened this slide 22 will be gripped and finger 8 will be held tightly against movement relative to extension 10.

In practice the screw 20 is rotated to release finger 8 and the construction of the tool is such that when the bearings 6 and 7 are adjusted to the pins of balance wheels of any sizes, the wheel will be held substantially parallel with the central longitudinal axis of the tool.

After the pin P of the balance wheel W has been placed in position the arms 1 and 2 are pressed toward each other so that the bearings 7 and 6 will engage the end of the pin. The arms are then locked against relative movement by pulling on lever 21. Screw 4 is adjusted to relieve the pin from excessive pressure and to permit the balance wheel to rotate freely. Indicator 17 is then adjusted to the rim of the balance wheel and the caliper can be used as ordinarily. The indicator 17 has two gauging fingers and it can be reversed on its pivot 18 so as to bring the active head of either finger into operative position relative to the wheel being trued. By referring particularly to Figure 2 it will be noted that the two fingers are of different sizes and proportions so that one of them can be used to advantage in truing a wheel of one size while the other can be used to advantage in truing a wheel of a smaller size. When one of the gauging fingers is adjusted to position close to the periphery of the wheel and the wheel rotated, it can be determined, by close observation of the wheel, whether its periphery moves toward the gauging finger as it rotates between its bearings.

Importance is attached to the fact that the end of the pin nearest the hairspring is seated in the offset bearing 7. Thus the user has an unobstructed view of the collet of the hairspring and can work on the innermost convolution of the spring with tweezers. The tool therefore, constitutes a combined truing and poising tool which enables the workman to true the hairspring while on the balance wheel. It will be noted that all operations can be performed with the thumb and forefinger of the hand holding the caliper and the shape of the tool is such that it can be held comfortably in the hand.

The other hand of the user is left free to work on the balance wheel and spring.

What is claimed is:

1. A caliper including opposed arms pivotally connected at one end, fixed and adjustable bearings on the other ends of the respective arms, the fixed bearing being extended outwardly from its arm to expose the collet and the inner convolution of the hairspring of a supported balance wheel, an arcuate guide finger extending from one of the arms, a slotted extension on the other arm slidably engaged by said finger, a supporting bar extending loosely through the extension and finger and longitudinally of the caliper, pivoted means slidably engaged by the bar for supporting the bar at a predetermined angle to the arms, and an indicator mounted for rotation on the bar and for cooperation with the rim of a supported balance wheel, said indicator having a projecting point for engagement by a finger of the hand holding the caliper.

2. A caliper for supporting the pin of a balance wheel with its hairspring collet and the innermost convolution of the hairspring exposed to view and for engagement by tweezers or the like, said caliper comprising opposed arms pivotally connected at one end, a bearing extending away from one of the arms at its other end and offset toward the other arm, said bearing being reduced for engagement by that end of the pin nearest the hairspring, an adjustable bearing for the other end of the pin mounted in the corresponding end of the other arm, pivotally and slidably connected bars having all portions thereof supported between the planes defined by the side surfaces of the arms and extending from and supported by the pivotal connection of the arms, and an indicator mounted for rotation on one of the bars about an axis intersecting the arms for cooperation with the rim of a supported balance wheel.

JAMES HERBERT BRYANS.